US007238754B1

(12) United States Patent
Scheie et al.

(10) Patent No.: US 7,238,754 B1
(45) Date of Patent: Jul. 3, 2007

(54) SOLID STATE PROCESS TO MODIFY THE MELT CHARACTERISTICS OF POLYETHYLENE RESINS AND PRODUCTS

(75) Inventors: Andrew J. Scheie, Cincinnati, OH (US); Harilaos Mavridis, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/299,438

(22) Filed: Dec. 12, 2005

(51) Int. Cl.
*C08C 19/04* (2006.01)
*C08F 8/06* (2006.01)

(52) U.S. Cl. .................. 525/387; 525/333.8; 525/383
(58) Field of Classification Search ................ 525/387, 525/333.8, 383
See application file for complete search history.

(56) References Cited

U.S. PATENT DOCUMENTS

| 3,153,025 | A | * | 10/1964 | Bush et al. ............... 525/387 |
| 3,322,711 | A | * | 5/1967 | Bush et al. ............... 524/586 |
| 4,459,388 | A |   | 7/1984 | Hettche et al. |
| 4,889,897 | A |   | 12/1989 | Schuster et al. |
| 5,064,908 | A | * | 11/1991 | Schuster et al. ......... 525/333.8 |
| 5,401,811 | A | * | 3/1995 | Stuart, Jr. .................. 525/388 |
| 5,534,472 | A |   | 7/1996 | Winslow et al. |
| 5,962,598 | A |   | 10/1999 | Mack et al. |
| 6,103,833 | A | * | 8/2000 | Hogt et al. ................ 525/386 |
| 6,171,993 | B1 |  | 1/2001 | Mavridis et al. |

FOREIGN PATENT DOCUMENTS

WO      WO 01/46269      *   6/2001
WO      WO 2006/036348 A *   4/2006

OTHER PUBLICATIONS

Bremner et al., "Peroxide modification of linear low-density polyethylene: a comparison of dialkyl peroxides" Journal of Applied Polymer science, 49(5), 785-798 (1933).*
Perez et al., "Rheological study of linear high density polyethylenes modified with organic peroxide", Polymer, 43(9), 2711-2720(2002).*
U.S. Appl. No. 10/930,295, filed Aug. 31, 2004, A.J. Scheie.
R. Shroff and H. Mavridis: *J. Applied Polymer Science 57* (1995), pp. 1605:1626 entitled "New Measures of Polydispersity from Rheological Data on Polymer Melts."

* cited by examiner

*Primary Examiner*—Ling-Sui Choi
(74) *Attorney, Agent, or Firm*—Gerald A. Baracka; William A. Heidrich

(57) ABSTRACT

A process for improving the melt characteristics of polyethylene resins is provided. The process involves contacting a polyethylene resin powder with a low level of free radical initiator at a temperature below the melting point of the resin.

12 Claims, No Drawings

SOLID STATE PROCESS TO MODIFY THE MELT CHARACTERISTICS OF POLYETHYLENE RESINS AND PRODUCTS

FIELD OF THE INVENTION

The invention relates to a process for the modification of polyethylene resins to improve melt characteristics. More specifically, the invention relates to a process for the solid state modification of ethylene copolymer powders utilizing free radical initiating agents and to improved products produced by such modification.

BACKGROUND OF THE INVENTION

Modification of polyethylene resins in the melt state using free radical initiators is known. One such process for the production of polyethylene films is described in U.S. Pat. No. 5,962,598. The process involves melt extruding a linear copolymer at a temperature of at least 180° C. in the presence of an amount of free radical initiator sufficient to improve bubble stability. Melt phase processes of this type are, however, difficult to control and often produce undesirable amounts of gels.

Free radical initiators, particularly, peroxides have also been utilized for the solid state oxidation of polyethylene resins to produce emulsifiable products. Such processes are described in U.S. Pat. Nos. 3,322,711; 4,459,388; 4,889,897; 5,064,908 and 5,401,811. Whereas these reactions utilize free radical initiators with particulate polyethylene resins, they are typically carried out under conditions so that polyethylenes having high acid numbers are produced.

In one process for the oxidation of polyethylene in a fluidized bed reactor (U.S. Pat. No. 4,459,388) high density polyethylene powder is combined with 500 to 20000 ppm free radical forming compound in the absence of oxygen and heated below the softening point of the high density polyethylene to decompose the initiator prior to introduction into a fluidized bed reactor where it is oxidized. Treatment of polyethylenes utilizing high levels of free radical initiators in this manner produces low molecular weight species which limits utility to certain applications, namely, water-emulsifiable applications.

In copending application Ser. No. 10/930,295, multimodal polyethylene powders obtained by blending high and low molecular weight components made in multistage polymerization reactors are modified in the solid state utilizing free radical initiators at levels from 1 to 4500 ppm. Multimodal polyethylene resins modified in accordance with this process have reduced die swell and increased melt strength.

It would be highly advantageous if other polyethylene resins could be modified with low levels of peroxide in the solid state to enhance one or more of their melt characteristics.

SUMMARY OF THE INVENTION

A process for the solid state modification of polyethylene resins to improve their melt characteristics is provided. The process comprises contacting an ethylene copolymer resin powder with an effective amount of organic free radical initiator at a temperature above the initiation temperature of the organic free radical initiator and below the melting point of the ethylene copolymer resin to increase the ER of the modified resin at least 10 percent. Powders modified in accordance with the invention typically have average particle sizes from 5 to 2000 microns and, more preferably, from 75 to 1500 microns.

Polyethylene resins which are advantageously modified are copolymers of ethylene and an α-olefin comonomer selected from the group consisting of butene-1, hexene-1 and octene-1 having a density from 0.89 to 0.965 g/cm$^3$. In a highly useful embodiment linear low density polyethylene resin powders having densities from 0.915 to 0.935 g/cm$^3$ are modified. Highly useful films having improved melt characteristics and shrink properties are obtained using linear low density resins modified in accordance with the solid state process of the invention.

Free radical initiators employed for the process are selected from the group consisting of organic peroxides, organic hydroperoxides and azo compounds. Organic peroxides and especially organic peroxides selected from the group consisting of dicumyl peroxide, 2,5-dimethyl-2,5-di (t-butylperoxy)hexane and t-amyl peroxypivalate are particularly advantageous for the process. The amount of free radical initiator used will generally range from 0.5 to 450 ppm; however, free radical initiator levels from 1 to 350 ppm are preferred.

DETAILED DESCRIPTION OF THE INVENTION

The present invention is a process for the modification of polyethylene (PE) resins to improve their melt characteristics. In its broadest terms, the process entails the solid state modification of PE resin powder, also referred to herein as the base resin, by incorporating a free radical initiator into the resin powder followed by controlled heating of the mixture below the melting point of the resin to effect changes in one or more melt characteristics of the resin. Observed melt enhancements can include improved melt strength, improved melt elasticity and improved processability. Moreover, these improvements are achieved without significant oxidation of the resin and without significantly altering molecular weight or molecular weight distribution of the resin.

Polyethylene resin powders utilized for the process are those commonly produced by slurry or gas phase polymerization processes having average particle sizes from about 5 to 2000 microns. More typically, the average particle size of the powders ranges from about 75 to 1500 microns. In a particularly useful embodiment of the invention the average particle size of the polyethylene resin powder is in the range 100 to about 1200 microns.

A free radical initiator is combined with the polyethylene resin powder and uniformly distributed therein and adsorbed on the powder particles. Any suitable mixing means whereby the free radical initiator is distributed throughout the entire powder volume and uniformly adsorbed on the powder particles can be employed. Such methods may include stirring, rolling, tumbling, fluidization and the like.

The free radical initiator may be added directly to powder as it exits the polymerization reactor or at any stage in the powder handling/recovery/storage process. As a result, the temperature at which the free radical initiator and resin powder are combined and mixed can vary over a wide range. The only requirement in this regard is that the temperature not be so high as to decompose the free radical initiator to such an extent that it is ineffective for modification before it is uniformly distributed in the powder. In such a case it will be necessary to lower the temperature of the powder before addition of the free radical initiator and/or use a free radical initiator having a higher initiation temperature.

The free radical initiator may be combined with a suitable solvent to facilitate distribution within the resin powder. Use of a solvent also enables the use of solid free radical initiators. If a solvent is used, it will preferably be an organic hydrocarbon having a sufficiently low boiling point so that it will be volatilized during mixing and/or the subsequent heating.

Free radical initiators employed for the process include organic peroxides, organic hydroperoxides and azo compounds which decompose at temperatures below the melting point of the polyethylene resin. Examples of suitable organic peroxides are dicumyl peroxide, di-t-butyl peroxide, t-butylperoxybenzoate, 2,5-dimethyl-2,5-di(t-butylperoxy)hexane, t-butyl peroxyneodecanoate, 2,5-dimethyl-2,5-di(t-butylperoxy)hexyne, t-amyl peroxypivalate, 1,3-bis(t-butylperoxyisopropyl)benzene, and the like. Representative hydroperoxides include di-t-butyl hydroperoxide, t-butyl hydroperoxide and the like. Suitable azo compounds include 2,2'-azo-diisobutyronitrile, 2-phenylazo-2,4-dimethyl-4-methoxyl-valeronitrile, 2,2'-azobis(N-butyl-2-methylpropionamide), and the like.

Organic peroxides are most advantageously used and dicumyl peroxide, 2,5-dimethyl-2,5-di(t-butylperoxy) hexane and t-amyl peroxypivalate are especially useful organic peroxides for the modification process of the invention.

Polyethylene resin powders advantageously modified in accordance with the solid state modification process of, the invention are ethylene-α-olefin copolymers. Copolymers of ethylene with butene-1, hexene-1 and octene-1 are particularly advantageous. The copolymers are produced by known polymerization procedures and will typically contain 0.1 to 7.5 weight percent (wt. %) comonomer or mixture of comonomers and have densities ranging from about 0.89 and 0.965 g/cm$^3$. Copolymers within this density range encompass very low density polyethylene (VLDPE), low density polyethylene (LDPE), linear low density polyethylene (LLDPE), medium density polyethylene (MDPE) and high density polyethylene (HDPE) resins. Resins of the above types can be obtained utilizing Ziegler, Phillips or metallocene technology in processes, most preferably slurry or gas phase processes, capable of producing resin powders having particle sizes within the prescribed ranges. Copolymers having densities in the range 0.910 to 0.955 g/cm$^3$ and, more preferably, from 0.915 to 0.945 g/cm$^3$ are particularly well suited for solid state modification by the process of the invention. Densities referred to herein were determined in accordance with ASTM D 1505.

Modification is brought about by maintaining the resin powder having the free radical adsorbed thereon at a temperature below the melting point of the resin and for a period of time sufficient to effect the desired change in melt characteristics. The temperature and time will vary depending on the resin being modified, the amount and type of free radical initiator used, powder particle size and other factors. In general, however, temperatures within the range 40° C. to 115° C. are employed. More preferably, the temperature is maintained with the range 50° C. to 110° C. and, most preferably, from 75° C. to 105° C.

For most operations, and particularly large scale operations, the modification time is several times the initiator's half life. This provides maximum modification and also minimizes the possibility of undesirable initiator residue in the modified resin. Although low levels of undecomposed initiator are not detrimental, the presence of significant amounts of unreacted initiator in the modified resin powder can result in the formation of gels and other undesirable effects during subsequent processing/fabrication of the modified resin.

While the amount of free radical initiator used can vary, high levels of initiator are detrimental and do not produce the desired modification, i.e., improvement in melt characteristics. For this reason, the amount of free radical initiator combined with the powder will generally be in the range from about 0.5 to 450 ppm. The free radical initiator is more preferably utilized in an amount from about 1 to 350 ppm and, in a particularly useful embodiment, from about 2 ppm to 200 ppm free radical initiator is employed. The latter ranges are particularly useful when organic peroxide initiators are employed. Not all of the initiator need be decomposed in order to effect modification of the resin; however, as pointed out above large excesses of undecomposed initiator are generally considered to be undesirable.

As previously pointed out, the free radical initiator may be added directly to the reactor powder, i.e., resin exiting the polymerization reactor(s), or to powder which has been stored for a period of time. In the first case the powder may be sufficiently warm, i.e., at or above the initiation temperature of the organic initiator, to effect modification of the resin without additional heating. For example, in slurry, i.e., particle form, polymerization processes, where polyethylene slurry from the reactor is sent to a flash drum where solvent and unreacted monomers are removed and the powder dried in one or more driers, the free radical initiator can be mixed with the polyethylene powder in the flash drum and the modification can occur in the driers. In other manufacturing operations, the initiator can be combined with warm polyethylene powder prior to transfer to a storage silo where the mixture can be held for a sufficient period for modification to occur.

If the resin is at ambient temperature or sufficiently below the free radical initiation temperature, as it would be if the resin were stored for an extended period prior to modification, additional heating may be required. In this case, and preferably after incorporation/uniform distribution of the organic initiator in the resin powder, the temperature of the mixture is raised above the initiation temperature of the free radical initiator but below the melting point of the polyethylene resin to effect modification. As employed herein, initiation temperature refers to the temperature at which the initiator will begin to decompose and generate free radicals.

Modifying PE resin powders of the above types in the solid state using low levels of free radical initiators, particularly organic peroxides, produces significant improvement in resin melt characteristics without substantially altering the molecular weight or molecular weight distribution (MWD) of the polymer or producing undesirable gels.

Enhanced melt characteristics of the solid state-modified resins are demonstrated by comparing various dynamic rheological data generated for unmodified PE base resin and resin modified in accordance with the invention. These data are generated using any rheometer capable of measuring dynamic mechanical properties of polymer melts over a range of frequencies such as a Rheometric Mechanical Spectrometer Model 605 or 705 or Rheometrics Dynamic Analyzer RDA2 or ARES Analyzer.

More specifically, PE resins modified in accordance with the invention unexpectedly exhibit significantly improved rheological polydispersity. Rheological polydispersity, which is obtained from rheological measurements performed on molten resins and is influenced by the type and amount of branching, chain extension and other inter- and intramolecular interactions, is commonly used to show changes in melt elasticity and "ER" is one of the art-recognized measures of rheological polydispersity. ER is determined from plots of storage modulus (G') versus loss modulus (G") and is a measure of high-molecular-weight-end polydispersity. ER is conveniently determined as discussed in R. Shroff and H. Mavridis, "New Measures of Polydispersity from Rheological Data on Polymer Melts," *J. Applied Polymer Science* 57 (1995) 1605. See also U.S. Pat. Nos. 6,171,993 and 5,534,472, the teachings of which are incorporated herein by reference.

PE resins modified in accordance with the present process by contacting the resin powders with low levels of free radical initiators in the solid state exhibit an increase in ER of at least 10 percent and, in some instances, up to several hundred percent. Preferably, when modified in accordance with the invention, ER of the PE resins is increased by 20% or more. Moreover, this increase in ER is accomplished without the formation of gels and while maintaining a weight average molecular weight ($M_w$) suitable for melt processing, e.g., greater than 30,000. It has further been observed that, in most instances, modification can be accomplished without significantly altering the weight average molecular weight. Whereas it may be possible to achieve some improvement in rheological polydispersity (ER) using low levels of free radical initiators in extrusion modification procedures, the degree of improvement is significantly less and, in many instances, the increase in ER is accompanied by the formation of gels and/or significant change in molecular weight or molecular weight distribution.

In addition to the ability to increase melt elasticity (ER) of the PE resins, in most instances a corresponding increase in complex viscosity ($\eta^*$) at low frequencies, i.e., at low shear, is also realized. These complex viscosities, typically measured at frequencies of 0.1 radians/second (rad/sec), are referred to herein as low-shear viscosities. Improved processability of the modified polyethylene resins, as evidenced by decreased complex viscosities at high frequencies, i.e., at high shear, may also be obtained. The latter complex viscosities, typically measured at frequencies of 100 rad/sec, are referred to herein as high-shear viscosities.

Additionally, the above-described modifications are achieved without significant oxidation of the PE resin, i.e., the acid number of the resin is essentially unchanged.

Polyethylene resins modified in accordance with the above-described solid state procedure are advantageously utilized in any application where the base, i.e., unmodified, resin can be used. They are particularly advantageous, however, in those applications where superior melt properties are desirable, such as for extrusion coating, thermoforming, blow molding and foaming operations. They are highly useful for the production of films, sheets, pipes and profiles. The modified polyethylene resins of the invention are particularly useful for blown film applications where ease of extrusion and bubble stability are primary concerns.

In a particularly useful embodiment, LLDPE is modified to provide resins having improved melt properties capable of being fabricated into films having highly desirable shrink characteristics. LLDPEs, most notably copolymers of ethylene with butene-1, hexene-1 and octene-1 having densities from 0.915 to 0.935 g/cm$^3$ and melt indexes (MIs) from 0.1 to 2.5 g/10 min, are commonly used for the production of blown films. While these films exhibit good toughness, tensile and resistance to environmental stress cracking, some well known drawbacks include low melt strength, susceptibility to melt fracture and low shrink. Films obtained using the solid state modified LLDPE resins produced in accordance with the process of the invention have significantly improved shrink characteristics, in many instances comparable to that obtained with LDPE films, without significantly affecting other desirable film properties. Melt indexes referred to herein were determined in accordance with ASTM D 1238-01, condition 190/2.16.

The following laboratory scale experiments illustrate the invention; however, those skilled in the art will recognize numerous variations within the spirit of the invention and scope of the claims.

Rheological Measurements and Calculations

Rheological measurement were performed in accordance with ASTM 4440-95a, which measures dynamic rheology data in the frequency sweep mode. A Rheometrics ARES rheometer was used. Unless otherwise indicated the rheometer was operated at 190° C. in the parallel plate mode (plate diameter 50 mm) in a nitrogen environment to minimize sample oxidation/degradation with a gap in the parallel plate geometry of 1.2-1.4 mm and strain amplitude of 10%. Frequencies ranged from 0.0251 to 398.1 rad/sec.

As will be recognized by those skilled in the art, specific complex viscosity data referred to herein are provided only to demonstrate the improvements observed with the modified resins of the invention relative to the unmodified base resin and are not intended to be limiting since they are generated under a specific set of conditions. Rheological data generated using different conditions, e.g., temperature, percent strain, plate configuration, etc., could result in complex viscosity values which are higher or lower than those reported. $\eta^*$ values reported herein are in poise.

ER was determined by the method of Shroff, et al., supra (see also U.S. Pat. No. 5,534,472 at Column 10, lines 20-30). Storage modulus (G') and loss modulus (G") were measured. The nine lowest frequency points were used (five points per frequency decade) and a linear equation was fitted by least-squares regression to log G' versus log G". ER was then calculated from:

$$ER = (1.781 \times 10^{-3}) \times G'$$

at a value of G"=5,000 dyn/cm$^2$.

As those skilled in the art will recognize, when the lowest G" value is greater than 5,000 dyn/cm$^2$, the determination of ER involves extrapolation. The ER values calculated then will depend on the degree on nonlinearity in the log G' versus log G" plot. The temperature, plate diameter and frequency range are selected such that, within the resolution of the rheometer, the lowest G" value is close to or less than 5,000 dyne/cm$^2$.

Molecular Weight Determination

Weight average molecular weight ($M_w$), number average molecular weight ($M_n$) and molecular weight distribution (MWD) of the polymers were obtained by gel permeation chromatography (GPC) using a Waters GPC2000CV high temperature instrument equipped with a mixed bed GPC column (Polymer Labs mixed with B-LS). Samples were prepared by dissolving 6 mg of the PE resin in 2.75 ml 1,2,4-trichlorobenzene. The mobile phase was used at a nominal flow rate of 1.0 ml/min and temperature of 145° C.

Molecular weights were calculated using a narrow polystyrene calibration curve using appropriate Mark-Houwink constants and Waters Empower software. The Mark-Houwink constants, K and alpha, were 0.000374 and 0.728 respectively for polyethylene and 0.0001387 and 0.7 for polystyrene.

EXAMPLE 1

A commercial medium density PE resin powder utilized for rotomolding applications (density 0.940 g/cm$^3$, MI 3.6 g/10 min; melting point 125° C.) was modified in accordance with the invention. The PE resin used was a copolymer of ethylene and hexene-1 and the powder had an average particle size of approximately 1000 microns. The PE powder was combined with 10 ppm 2,5-dimethyl-2,5-di(t-butylperoxy) hexane and tumbled for 15 minutes at 25° C. to insure uniform distribution and adsorption of the peroxide on the resin powder particles. The resin powder was then placed in an oven and maintained at 100° C. for 20 hours after which time essentially all of the peroxide was decomposed.

Rheological properties of the modified resin and unmodified base resin powder were determined and are reported in Table 1. Molecular weight data are also provided.

The modified resin had markedly improved melt characteristics as evidenced by the significantly higher ER (160% higher than the unmodified base resin) and substantially improved low-shear viscosity—106% increase of $\eta^*@0.1$ rad/sec over that of the base resin. Moreover, the above improvements in melt strength and melt elasticity are achieved while improving the melt processability of the resin as evidenced by a decrease in high-shear viscosity, i.e., lower dynamic complex viscosity at 100 rad/sec.

It should further be noted that all of the above improvements are achieved without the formation of gels. Cast films of the solid state modified resin and unmodified base resin were scanned for gels using an optical gel counter. For gels over 150 microns, the two resins showed no difference verifying that the rheological effects were not the result of crosslinking.

$M_w$ of the modified resin was within 16% of the original $M_w$ and the MWD was not significantly changed.

EXAMPLE 2

In a manner similar to that described in Example 1, a commercial high density PE powder was subjected to solid state modification in accordance with the invention. The HDPE used was a copolymer of ethylene and butene-1 and had a density of 0.9435 g/cm$^3$ and MI of 0.7 g/10 min. Resins of this type are commonly used for extrusion of wire and cable insulation. The average particle size of the powder was approximately 850 microns. The type and amount of peroxide used and treatment procedures were the same as described for Example 1. No gels were observed to be formed as a result of the modification. Rheological and molecular weight data for the modified HDPE powder is reported in Table 1 along with data for the control, i.e., unmodified HDPE base resin. Rheological data were generated as described above except that the plate diameter was 25 mm and strain amplitude was 20%.

Whereas the modified and unmodified resins exhibit essentially the same high-shear viscosities, the modified resin exhibited significantly improved rheological polydispersity (26% increase in ER) and 32% increase in low-shear viscosity. $M_w$ of the modified and unmodified resins were substantially the same.

EXAMPLE 3

To demonstrate the versatility and broad applicability of the modification process, a commercial LLDPE powder was modified following the general procedure of Example 1. The LLDPE resin was a copolymer of ethylene and hexene-1 having a density of 0.930 g/cm$^3$, MI of 0.8 g/10 min and melting point of 125° C. Resins of this type are commonly used for the production of blown films. The average particle size of the powder was approximately 100 microns. Ten (10) ppm 2,5-dimethyl-2,5-di(t-butylperoxy) hexane was combined with the powder and the mixture maintained at 100° C. for 20 hours. The resulting modified LLDPE was essentially gel free and there was no detectable peroxide residue.

To demonstrate that no significant oxidation occurred under the modification conditions, samples of the LLDPE base resin and modified resin were analyzed by titration to determine acid number. For the procedure, duplicate blank solvent and sample solutions were titrated using a 0.1014N KOH solution. The average volume of titrant for duplicate blank solvent analyses was 0.090 ml titrarit (equivalent to 0.009 acid number for 1 g sample). Acid number of each sample analysis was calculated by subtracting the average titrant volume for the blank from the titrant volume for the sample analysis. The resulting titrant volume was multiplied by the normality of the titrant and divided by the sample weight to obtain the acid numbers in milliequivalents of COOH per gram of sample. Acid numbers for modified and unmodified resins were essentially the same, 0.0013 and 0.0017, respectively, which is considered to be within the limits of experimental error for this procedure.

Rheological and molecular weight data generated for the modified LLDPE and unmodified base resin are provided in Table 1. Rheological measurements were conducted as previously described except the rheometer was operated at 150° C., the plate diameter was 25 mm and strain amplitude was 20%.

Whereas the molecular weight ($M_w$), MWD and high-shear viscosity of the modified LLDPE and unmodified LLDPE base resin were comparable, remarkable improvements in melt elasticity (over 600% increase in ER) and melt strength (400% increase in low-shear viscosity) were observed with the modified resin.

To demonstrate the significance of the above improvements, 4 mil films were blown using the modified LLDPE resin and the base resin and compared. The films were fabricated on a laboratory blown film line—the main components of which included a 2" smooth bore extruder, a 24:1 L/D barrier screw with a Maddock mixing section, a 4" diameter spiral mandrel die with a 0.060" die gap and a dual lip air ring. Film fabrication conditions were: output rate of 60 lb/hr, melt temperature of 410-430° F., blow-up-ratio (BUR) of 2.5 and frostline height of 11". Properties of films blown from the modified and unmodified LLDPEs are set forth in Table 2. It is apparent from the data that the film produced using the LLDPE resin modified in accordance with the process of the invention exhibited a high degree of shrink making it suitable for use for shrink film applications where LLDPE resins have heretofore not typically been employed.

TABLE 1

| | $\eta^*$ @ 100 rad/sec | $\eta^*$ @ 0.1 rad/sec | ER | $M_n$ | $M_w$ | MWD |
|---|---|---|---|---|---|---|
| Ex 1 (modified) | 8.14 × 10$^3$ | 6.75 × 10$^4$ | 2.09 | 23213 | 82583 | 3.56 |
| Ex 1 (unmodified) | 1.0 × 10$^4$ | 3.27 × 10$^4$ | 0.80 | 25814 | 97958 | 3.79 |
| Ex 2 (modified) | 1.04 × 10$^4$ | 2.5 × 10$^5$ | 4.98 | 12902 | 132269 | 10.25 |
| Ex 2 (unmodified) | 9.99 × 10$^3$ | 1.89 × 10$^5$ | 3.94 | 13718 | 131407 | 9.58 |
| Ex 3 (modified) | 2.29 × 10$^4$ | 1.19 × 10$^6$ | 8.10 | 25052 | 113872 | 4.55 |
| Ex 3 (unmodified) | 2.74 × 10$^4$ | 2.38 × 10$^5$ | 1.07 | 28062 | 119142 | 4.25 |

TABLE 2

|  | Modified LLDPE | Unmodified LLDPE |
|---|---|---|
| 1% Secant Modulus (MD) | 63,300 | 59,100 |
| 1% Secant Modulus (TD) | 75,400 | 64,300 |
| % Shrink (MD) | 75 | 51 |
| % Shrink (TD) | 45 | 16 |

EXAMPLE 4 AND COMPARATIVE EXAMPLE 5

To demonstrate the difference between the solid state peroxide modification process of the invention and peroxide modification carried out in the melt state, the following comparative example wherein LLDPE was modified using both techniques is presented. The same LLDPE resin was used for both procedures. It was a copolymer of ethylene and butene-1 and had a density of 0.919 g/cm$^3$, MI of 1.0 g/10 min and melting point of 125° C. One sample (Example 4) was modified in accordance with the procedure described for Example 3. Another sample (Comparative Example 5) was tumbled for one hour at room temperature with 10 ppm of the same peroxide and directly extruded and pelletized using a twin-screw extruder. The results in Table 3 below clearly show that the two methods do not produce the same effects.

TABLE 3

|  | η* @ 100 rad/sec | η* @ 0.1 rad/sec | ER |
|---|---|---|---|
| Ex 4 | 2.09 × 10$^4$ | 1.06 × 10$^6$ | 6.21 |
| Comp Ex 5 | 2.33 × 10$^4$ | 3.02 × 10$^5$ | 2.97 |
| Control* | 2.50 × 10$^4$ | 2.71 × 10$^5$ | 2.34 |

*the unmodified base resin.

Whereas 165% increase in melt elasticity (ER) was achieved with the solid state modified resin of the invention, the ER of resin contacted with the same amount of peroxide in the melt state was only increased by 21%.

COMPARATIVE EXAMPLE 6

To demonstrate the need to utilize low levels of free radical initiator for the solid state modification process, Example 1 was repeated using a commercial HDPE powder (ethylene-butene-1 copolymer; density 0.950 g/cm$^3$; MI 0.05 g/10 min) and 2000 ppm peroxide. Results were as follows:

|  | η* @ 100 rad/sec | ER | $M_n$ | $M_w$ | MWD |
|---|---|---|---|---|---|
| Example 6 (modified) | 3.13 × 10$^1$ | 1.20 | 4,447 | 14,973 | 3.37 |
| Example 6 (unmodified) | 2.53 × 10$^4$ | 2.71 | 12,819 | 313,611 | 24.46 |

The data clearly demonstrates that using high peroxide levels produces a disadvantageous result. Melt elasticity of the modified resin was reduced and the molecular weight is significantly changed.

We claim:

1. A process for modifying the melt characteristics of polyethylene resins comprising contacting an ethylene copolymer resin powder with an effective amount of organic free radical initiator at a temperature above the initiation temperature of the organic free radical initiator and below the melting point of the ethylene copolymer resin to increase the melt elasticity of the modified resin at least 10 percent, wherein the ethylene copolymer is a copolymer of ethylene and an α-olefin comonomer selected from the group consisting of butene-1, hexene-1 and octene-1 having a density from 0.89 to 0.965 g/cm$^3$ and the powder has an average particle size from 5 to 2000 microns.

2. The process of claim 1 wherein the amount of free radical initiator is from 0.5 to 450 ppm.

3. The process of claim 2 wherein the free radical initiator is selected from the group consisting of organic peroxides, organic hydroperoxides and azo compounds.

4. The process of claim 3 wherein the organic free radical initiator is an organic peroxide and is utilized in an amount from 1 to 350 ppm.

5. The process of claim 4 wherein the organic free radical initiator is an organic peroxide selected from the group consisting of dicumyl peroxide, 2,5-dimethyl-2,5-di(t-butylperoxy)hexane and t-amyl peroxypivalate.

6. The process of claim 3 wherein the ethylene copolymer has a density from 0.910 to 0.955 g/cm$^3$ and the powder has an average particle size from 75 to 1500 microns.

7. The process of claim 6 wherein the ethylene copolymer is an ethylene-butene-1 copolymer having a density from 0.915 to 0.945 g/cm$^3$.

8. The process of claim 6 wherein the ethylene copolymer is an ethylene-hexene-1 copolymer having a density from 0.915 to 0.945 g/cm$^3$.

9. A process for modifying the melt characteristics of a linear low density polyethylene resin comprising contacting a linear low density powder of a copolymer of ethylene and an α-olefin selected from the group consisting of butene-1, hexene-1 and octene-1 having a density from 0.915 to 0.935 g/cm$^3$ with 0.5 to 450 ppm free radical initiator selected from the group consisting of organic peroxides, organic hydroperoxides and azo compounds at a temperature above the initiation temperature of the free radical initiator and below the melting point of the linear low density copolymer resin to effect an increase in melt elasticity of at least 10 percent.

10. The process of claim 9 wherein the free radical initiator is an organic peroxide selected from the group consisting of dicumyl peroxide, 2,5-dimethyl-2,5-di(t-butylperoxy)hexane and t-amyl peroxypivalate.

11. The process of claim 10 wherein the free radical initiator is utilized in an amount from 1 to 350 ppm and the temperature is from 50° C. to 110° C.

12. A process for modifying the melt characteristics of a polyethylene resin comprising contacting an ethylene copolymer resin powder under substantially non-oxidizing conditions with an effective amount of an organic free radical initiator at a temperature above the initiation temperature of the organic free radical initiator and below the melting point of the copolymer to increase the melt elasticity of the copolymer by at least 10 percent without substantially increasing the acid number, said copolymer being a copolymer of ethylene and an α-olefin selected from the group consisting of butene-1, hexene-1 and octene-1 and having a density from 0.89 to 0.965 g/cm$^3$ and said powder having an average particle size from 5 to 2000 microns.

* * * * *